(12) United States Patent
Troia et al.

(10) Patent No.: US 12,143,519 B2
(45) Date of Patent: Nov. 12, 2024

(54) USING MEMORY AS A BLOCK IN A BLOCK CHAIN

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 367 days.

(21) Appl. No.: 17/574,287

(22) Filed: Jan. 12, 2022

(65) Prior Publication Data

US 2022/0138114 A1     May 5, 2022

Related U.S. Application Data

(63) Continuation of application No. 16/362,792, filed on Mar. 25, 2019, now Pat. No. 11,228,443.

(51) Int. Cl.
| | | |
|---|---|---|
| H04L 29/06 | (2006.01) | |
| G06F 12/02 | (2006.01) | |
| G06F 12/0891 | (2016.01) | |
| G06F 12/14 | (2006.01) | |
| H04L 9/00 | (2022.01) | |
| H04L 9/32 | (2006.01) | |
| H04L 9/40 | (2022.01) | |

(52) U.S. Cl.
CPC ............ H04L 9/50 (2022.05); G06F 12/0246 (2013.01); G06F 12/0891 (2013.01); G06F 12/1408 (2013.01); G06F 12/1433 (2013.01); H04L 9/3247 (2013.01); H04L 63/12 (2013.01)

(58) Field of Classification Search
None
See application file for complete search history.

(56) References Cited

U.S. PATENT DOCUMENTS

| | | |
|---|---|---|
| 9,621,549 B2 | 4/2017 | Benoit et al. |
| 9,875,510 B1 | 1/2018 | Kasper |
| | (Continued) | |

FOREIGN PATENT DOCUMENTS

| | | |
|---|---|---|
| JP | 2017-157926 A | 9/2017 |
| JP | 2018-516026 A | 6/2018 |
| | (Continued) | |

OTHER PUBLICATIONS

International Search Report and Written Opinion from related International Application No. PCT/US2020/024163, dated Jul. 6, 2020, 10 pages.

(Continued)

*Primary Examiner* — Andrew J Steinle
(74) *Attorney, Agent, or Firm* — Brooks, Cameron & Huebsch, PLLC

(57) ABSTRACT

The present disclosure includes apparatuses, methods, and systems for using memory as a block in a block chain. An embodiment includes a memory, and circuitry configured to generate a block in a block chain for validating data stored in the memory, wherein the block includes a cryptographic hash of a previous block in the block chain and a cryptographic hash of the data stored in the memory, and the block has a digital signature associated therewith that indicates the block is included in the block chain.

19 Claims, 9 Drawing Sheets

(56) References Cited

U.S. PATENT DOCUMENTS

| | | |
|---|---|---|
| 2014/0189340 A1 | 7/2014 | Hadley |
| 2014/0297985 A1 | 10/2014 | Graefe et al. |
| 2016/0028725 A1 | 1/2016 | Benoit et al. |
| 2016/0275461 A1 | 9/2016 | Sprague et al. |
| 2016/0350549 A1 | 12/2016 | Hampel et al. |
| 2017/0249482 A1 | 8/2017 | Takaai et al. |
| 2018/0054491 A1 | 2/2018 | Mankovskii et al. |
| 2018/0115416 A1 | 4/2018 | Diehl |
| 2018/0204191 A1 | 7/2018 | Wilson et al. |
| 2020/0050613 A1 | 2/2020 | Gauvreau |
| 2020/0228316 A1* | 7/2020 | Cahill .................. H04L 9/0637 |
| 2020/0244654 A1 | 7/2020 | Maheshwari et al. |
| 2020/0313851 A1* | 10/2020 | Mondello ............. G06F 3/0655 |
| 2021/0075623 A1* | 3/2021 | Petersen ............... H04L 9/3242 |

FOREIGN PATENT DOCUMENTS

| | | |
|---|---|---|
| KR | 10-2017-0039138 A | 4/2017 |
| KR | 10-1950507 B1 | 2/2019 |
| WO | 2018/043599 A1 | 3/2018 |

OTHER PUBLICATIONS

U.S. Appl. No. 15/853,498, entitled, "Physical Unclonable Function Using Message Authentication Code", filed Dec. 22, 2017, 28 pages.

U.S. Appl. No. 16/201,652, entitled, "Parking Infrastructure Powered By a Decentralized, Distributed Database", filed Nov. 27, 2018, 27 pages.

U.S. Appl. No. 15/993,119, entitled, "Transmission of Vehicle Route Information By Passive Devices", filed May 30, 2018, 25 pages.

U.S. Appl. No. 16/034,763, entitled, "Secure Vehicular Communication", filed Jul. 13, 2018, 37 pages.

U.S. Appl. No. 16/034,809, entitled, "Secure Vehicular Services Communication", filed Jul. 13, 2018, 36 pages.

PCT International Application Number PCT/IB2019/000089, entitled, "Method for Improving Safety of a Component or System Running a Firmware or a Finite State Machine", filed Feb. 22, 2019, 42 pages.

\* cited by examiner

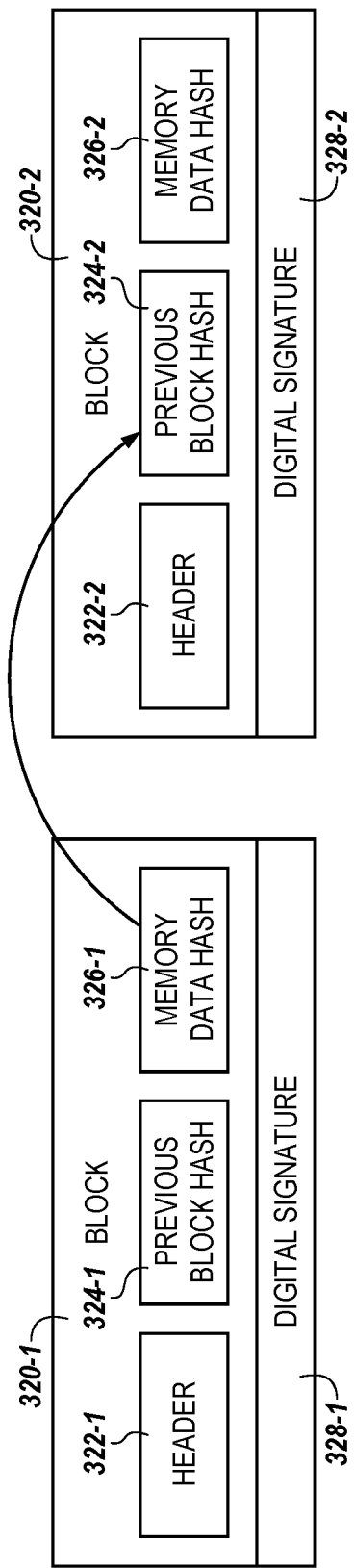

USING MEMORY AS A BLOCK IN A BLOCK CHAIN

PRIORITY INFORMATION

This application is a Continuation of U.S. application Ser. No. 16/362,792, filed on Mar. 25, 2019, the contents of which are incorporated herein by reference.

TECHNICAL FIELD

The present disclosure relates generally to semiconductor memory and methods, and more particularly, to using memory as a block in a block chain.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory. Non-volatile memory may be used in a wide range of electronic applications such as personal computers, portable memory sticks, digital cameras, cellular telephones, portable music players such as MP3 players, movie players, among others.

Flash memory devices can include memory cells storing data in a charge storage structure such as a floating gate, for instance. Flash memory devices typically use a one-transistor memory cell that allows for high memory densities, high reliability, and low power consumption. Resistance variable memory devices can include resistive memory cells that can store data based on the resistance state of a storage element (e.g., a resistive memory element having a variable resistance).

Memory cells can be arranged into arrays, and memory cells in an array architecture can be programmed to a target (e.g., desired) state. For instance, electric charge can be placed on or removed from the charge storage structure (e.g., floating gate) of a flash memory cell to program the cell to a particular data state. The stored charge on the charge storage structure of the cell can indicate a threshold voltage (Vt) of the cell. A state of a flash memory cell can be determined by sensing the stored charge on the charge storage structure (e.g., the Vt) of the cell.

Many threats can affect the data stored in the memory cells of a memory device. Such threats can include, for example, faults occurring in the memory device, and/or threats from hackers or other malicious users. Such threats can cause significant financial loss, and/or can present significant safety and/or security issues.

BRIEF DESCRIPTION OF THE DRAWINGS

FIG. 3 illustrates examples of blocks that can be used in a block chain for validating data stored in memory in accordance with an embodiment of the present disclosure.

FIG. 4A illustrates an example of a pair of registers used to define a secure memory array in accordance with an embodiment of the present disclosure.

DETAILED DESCRIPTION

Figure 1:
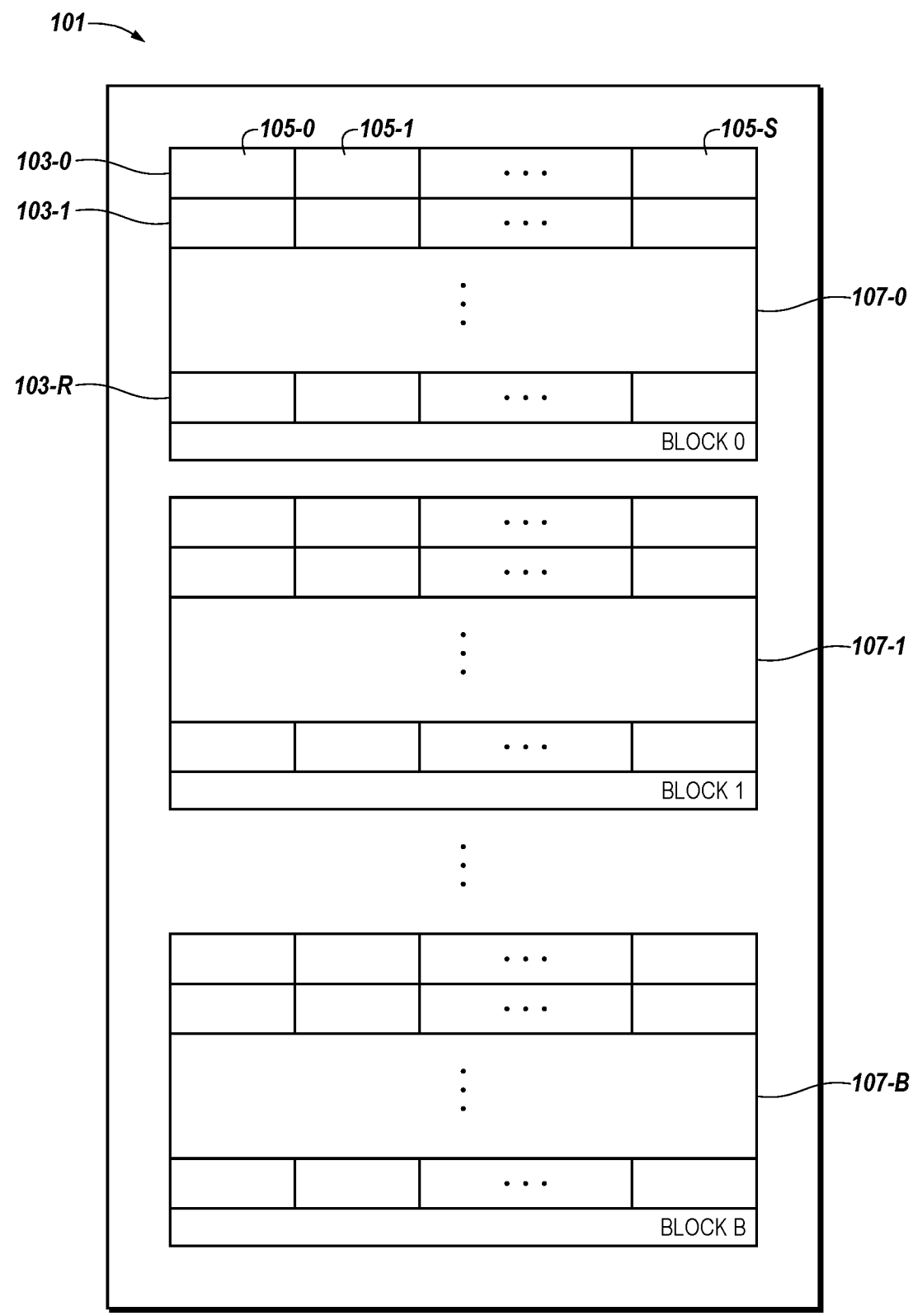
FIG. 1 illustrates a diagram of a portion of a memory array having a number of physical blocks in accordance with an embodiment of the present disclosure.

The present disclosure includes apparatuses, methods, and systems for using memory as a block in a block chain. An embodiment includes a memory, and circuitry configured to generate a block in a block chain for validating data stored in the memory, wherein the block includes a cryptographic hash of a previous block in the block chain and a cryptographic hash of the data stored in the memory, and the block has a digital signature associated therewith that indicates the block is included in the block chain. In some embodiments, a particular and/or specific physical block of memory in a memory, as described FIG. 1, may be used as such a block in a block chain. However, embodiments are not so limited.

Many threats can affect the data stored in a memory (e.g., in a memory device). For example, faults may occur in the array and/or circuitry of the memory, which can result in errors occurring in the data. As an additional example, a hacker or other malicious user may attempt to perform activities to make unauthorized changes to the data for malicious purposes. For instance, a malicious user may attempt to alter the data stored in a memory in order to adversely affect (e.g., divert the flow of) a commercial transaction being performed using the memory (e.g., to falsely indicate that payment has been made for the service being provided by skipping the code that verifies the payment), a software license check being performed on the memory (e.g., to falsely indicate the software of the memory is properly licensed by skipping the code that verifies the license), or automotive control being performed using the memory (e.g., to skip a check of the genuineness of a part, an environmental check, or a check of a malfunctioning alarm), among other types of hacking activities. Such hacking activities (e.g., attacks) can cause significant financial loss, and/or can present significant safety and/or security issues.

As such, in order to ensure a secure memory system, it is important to validate (e.g., authenticate and/or attest) that the data stored in the memory is genuine (e.g., is the same as originally programmed), and has not been altered by hacking activity or other unauthorized changes. Embodiments of the present disclosure can use memory as a block in a block chain data structure (e.g. use the memory as a storage component for the block chain) in order to effectively validate the data stored in the memory, and thereby ensure a secure memory system. For instance, embodiments of the present disclosure can modify the existing circuitry of the memory (e.g., the existing firmware of the memory device) to use the memory as the block in the block chain, such that the memory can be used as the block in the block chain without having to add additional (e.g., new) components or circuitry to the memory.

As used herein, "a", "an", or "a number of" can refer to one or more of something, and "a plurality of" can refer to two or more such things. For example, a memory device can refer to one or more memory devices, and a plurality of memory devices can refer to two or more memory devices. Additionally, the designators "R", "B", "S", and "N", as used herein, particularly with respect to reference numerals in the drawings, indicates that a number of the particular feature so designated can be included with a number of embodiments of the present disclosure. The number may be the same or different between designations.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2.

FIG. 1 illustrates a diagram of a portion of a memory array 101 having a number of physical blocks in accordance with an embodiment of the present disclosure. Memory array 101 can be, for example, a flash memory array such as a NAND flash memory array. As an additional example, memory array 101 can be a resistance variable memory array such as a PCRAM, RRAM, MMRAM, or spin torque transfer (STT) array, among others. However, embodiments of the present disclosure are not limited to a particular type of memory array. Further, memory array 101 can be a secure memory array, as will be further described herein. Further, although not shown in FIG. 1, memory array 101 can be located on a particular semiconductor die along with various peripheral circuitry associated with the operation thereof.

As shown in FIG. 1, memory array 101 has a number of physical blocks 107-0 (BLOCK 0), 107-1 (BLOCK 1), . . . 107-B (BLOCK B) of memory cells. The memory cells can be single level cells and/or multilevel cells such as, for instance, two level cells, triple level cells (TLCs) or quadruple level cells (QLCs). As an example, the number of physical blocks in memory array 101 may be 128 blocks, 512 blocks, or 1,024 blocks, but embodiments are not limited to a particular power of two or to any particular number of physical blocks in memory array 101.

A number of physical blocks of memory cells (e.g., blocks 107-0, 107-1, . . . 107-B) can be included in a plane of memory cells, and a number of planes of memory cells can be included on a die. For instance, in the example shown in FIG. 1, each physical block 107-0, 107-1, . . . 107-B can be part of a single die. That is, the portion of memory array 101 illustrated in FIG. 1 can be a die of memory cells.

As shown in FIG. 1, each physical block 107-0, 107-1, . . . 107-B includes a number of physical rows (e.g., 103-0, 103-1, . . . 103-R) of memory cells coupled to access lines (e.g., word lines). The number of rows (e.g., word lines) in each physical block can be 32, but embodiments are not limited to a particular number of rows 103-0, 103-1, . . . 103-R per physical block. Further, although not shown in FIG. 1, the memory cells can be coupled to columns of sense lines (e.g., data lines and/or digit lines).

As one of ordinary skill in the art will appreciate, each row 103-0, 103-1, . . . 103-R can include a number of pages of memory cells (e.g., physical pages). A physical page refers to a unit of programming and/or sensing (e.g., a number of memory cells that are programmed and/or sensed together as a functional group). In the embodiment shown in FIG. 1, each row 103-0, 103-1, . . . 103-R comprises one physical page of memory cells. However, embodiments of the present disclosure are not so limited. For instance, in an embodiment, each row can comprise multiple physical pages of memory cells (e.g., one or more even pages of memory cells coupled to even-numbered data lines, and one or more odd pages of memory cells coupled to odd numbered data lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

As shown in FIG. 1, a page of memory cells can comprise a number of physical sectors 105-0, 105-1, . . . 105-S (e.g., subsets of memory cells). Each physical sector 105-0, 105-1, . . . 105-S of cells can store a number of logical sectors of data. Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 105-0, 105-1, . . . 105-S, can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA may also correspond (e.g., dynamically map) to a physical address, such as a physical block address (PBA), that may indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks 107-0, 107-1, . . . 107-B, rows 103-0, 103-1, . . . 103-R, sectors 105-0, 105-1, . . . 105-S, and pages are possible. For example, rows 103-0, 103-1, . . . 103-R of physical blocks 107-0, 107-1, . . . 107-B can each store data corresponding to a single logical sector which can include, for example, more or less than 512 bytes of data.

Figure 2:
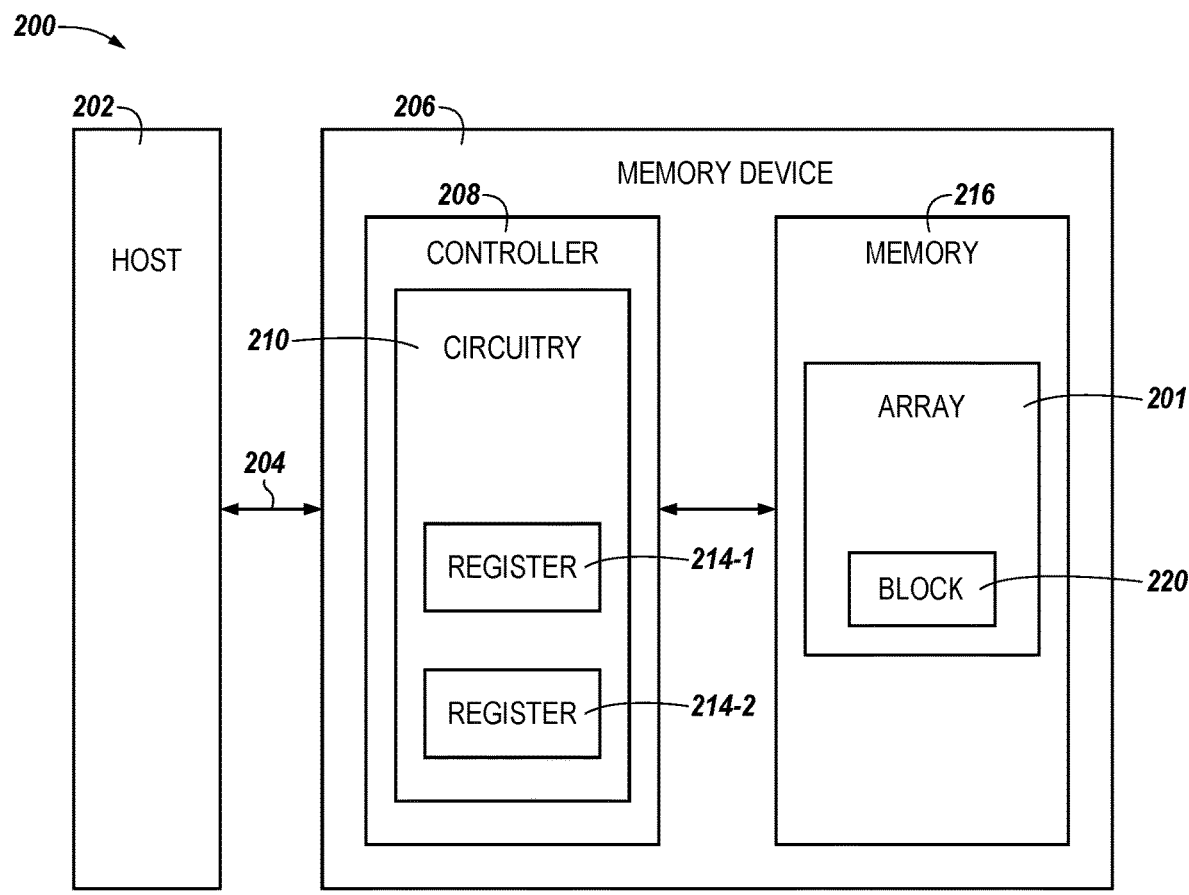
FIG. 2 is a block diagram of a computing system including a host and an apparatus in the form of a memory device in accordance with an embodiment of the present disclosure.

FIG. 2 is a block diagram of a computing system 200 including a host 202 and an apparatus in the form of a memory device 206 in accordance with an embodiment of the present disclosure. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 200 can include a number of memory devices analogous to memory device 206.

In the embodiment illustrated in FIG. 2, memory device 206 can include a memory 216 having a memory array 201. Memory array 201 can be analogous to memory array 101 previously described in connection with FIG. 1. Further, memory array 201 can be a secure array, as will be further described herein. Although one memory array 201 is illustrated in FIG. 2, memory 216 can include any number of memory arrays analogous to memory array 201.

As illustrated in FIG. 2, host 202 can be coupled to the memory device 206 via interface 204. Host 202 and memory device 206 can communicate (e.g., send commands and/or data) on interface 204. Host 202 and/or memory device 206 can be, or be part of, a laptop computer, personal computer, digital camera, digital recording and playback device, mobile telephone, PDA, memory card reader, interface hub, or Internet of Things (IoT) enabled device, such as, for instance, an automotive (e.g., vehicular and/or transportation infrastructure) IoT enabled device or a medical (e.g., implantable and/or health monitoring) IoT enabled device, among other host systems, and can include a memory access device (e.g., a processor). One of ordinary skill in the art will appreciate that "a processor" can intend one or more processors, such as a parallel processing system, a number of coprocessors, etc.

Interface 204 can be in the form of a standardized physical interface. For example, when memory device 206 is used for information storage in computing system 200, interface 204 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. In general, however, interface 204 can provide an interface for passing control, address, information (e.g., data), and other signals between memory device 206 and a host (e.g., host 202) having compatible receptors for interface 204.

Memory device 206 includes controller 208 to communicate with host 202 and with memory 216 (e.g., memory array 201). For instance, controller 208 can send commands to perform operations on memory array 201, including operations to sense (e.g., read), program (e.g., write), move, and/or erase data, among other operations.

Controller 208 can be included on the same physical device (e.g., the same die) as memory 216. Alternatively, controller 208 can be included on a separate physical device that is communicatively coupled to the physical device that includes memory 216. In an embodiment, components of controller 208 can be spread across multiple physical devices (e.g., some components on the same die as the memory, and some components on a different die, module, or board) as a distributed controller.

Host 202 can include a host controller (not shown FIG. 2) to communicate with memory device 206. The host controller can send commands to memory device 206 via interface 204. The host controller can communicate with memory device 206 and/or the controller 208 on the memory device 206 to read, write, and/or erase data, among other operations. Further, in an embodiment, host 202 can be an IoT enabled device, as previously described herein, having IoT communication capabilities.

Controller 208 on memory device 206 and/or the host controller on host 202 can include control circuitry and/or logic (e.g., hardware and firmware). In an embodiment, controller 208 on memory device 206 and/or the host controller on host 202 can be an application specific integrated circuit (ASIC) coupled to a printed circuit board including a physical interface. Also, memory device 206 and/or host 202 can include a buffer of volatile and/or non-volatile memory and a number of registers.

For example, as shown in FIG. 2, memory device can include circuitry 210. In the embodiment illustrated in FIG. 2, circuitry 210 is included in controller 208. However, embodiments of the present disclosure are not so limited. For instance, in an embodiment, circuitry 210 may be included in (e.g., on the same die as) memory 216 (e.g., instead of in controller 208). Circuitry 210 can comprise, for instance, hardware, firmware, and/or software.

Circuitry 210 can generate a block 220 in a block chain for validating (e.g., authenticating and/or attesting) the data stored in memory 216 (e.g., in memory array 201). The block 220 can include a cryptographic hash of (e.g., a link to) the previous block in the block chain, and a cryptographic hash of (e.g., identifying) the data stored in memory array 201. The block 220 can also include a header having a timestamp indicating when the block was generated. Further, the block 220 can have a digital signature associated therewith that indicates the block is included in the block chain. An example illustrating such a block will be further described herein (e.g., in connection with FIG. 3).

As used herein, a "block in a block chain", such as, for instance, block 220 illustrated in FIG. 2, can include data (e.g., payload), headers, timestamps, history, etc. However, as used herein a block in a block chain does not have to equate to the size of a block of memory as described previously in connection with FIG. 1. For instance, a block in a block chain may be smaller, equivalent, and/or larger than a block size denomination of a particular memory associated with an architecture or designation.

The cryptographic hash of the data stored in memory array 201, and/or the cryptographic hash of the previous block in the block chain, can comprise, for instance, a SHA-256 cryptographic hash. Further, the cryptographic hash of the data stored in memory array 201, and the cryptographic hash of the previous block in the block chain, can each respectively comprise 256 bytes of data.

The cryptographic hash of the data stored in memory array 201 can be generated (e.g., calculated), for example, by circuitry 210. In such an example, the cryptographic hash of the data stored can be internally generated by memory device 206 without having external data moving on interface 204. As an additional example, the cryptographic hash of the data can be communicated from an external entity. For instance, host 202 can generate the cryptographic hash of the data stored in memory array 201, and send the generated cryptographic hash to memory device 206 (e.g., circuitry 210 can receive the cryptographic hash of the data stored in memory array 201 from host 202).

The digital signature associated with the block 220 can be generated (e.g., calculated), for example, by circuitry 210 based on (e.g., responsive to) an external command, such as a command received from host 202. For instance, the digital signature can be generated using symmetric or asymmetric cryptography. As an additional example, host 202 can generate the digital signature, and send (e.g. provide) the generated digital signature to memory device 206 (e.g., circuitry 210 can receive the digital signature from host 202).

As shown in FIG. 2, the block 220, as well as the digital signature associated with block 220, can be stored in memory array 201. For example, the block 220 can be stored in a portion of memory array 201 that is inaccessible to a user of memory device 206 and/or host 202 (e.g., in a "hidden" region of memory array 201). Storing the block 220 in memory array 201 can simplify the storage of the block by, for example, removing the need for software storage management for the block.

In an embodiment, memory array 201 (e.g., a subset of array 201, or the whole array 201) can be a secure array (e.g., an area of memory 216 to be kept under control). For example, the data stored in memory array 201 can include sensitive (e.g., non-user) data, such as host firmware and/or code to be executed for sensitive applications. In such an embodiment, a pair of non-volatile registers can be used to define the secure array. For example, in the embodiment illustrated in FIG. 2, circuitry 210 includes registers 214-1 and 214-2 that can be used to define the secure array. For instance, register 214-1 can define the address (e.g., the starting LBA of the data) of the secure array, and register 214-2 can define the size (e.g., the ending LBA of the data) of the secure array. An example of such registers, and their use in defining a secure array, will be further described herein (e.g., in connection with FIGS. 4A-4B). Once the secure array has been defined, circuitry 210 can generate (e.g., calculate) a cryptographic hash associated with the secure array, which may be referred to herein as a golden hash, using authenticated and antireplay protected commands (e.g., so that only memory device 206 knows the golden hash, and only memory device 206 is capable of generating and updating it). The golden hash may be stored in inaccessible portion of memory array 201 (e.g., the same inaccessible portion in which block 220 is stored), and can be used during the process of validating the data of the secure array, as will be further described herein.

Memory device 206 (e.g., circuitry 210) can send, via interface 204, the block 220, along with the digital signature associated with block 220, to host 202 for validation of the data stored in memory array 201. For example, circuitry 210 can sense (e.g., read) the block 220 stored in memory array 201, and send the sensed block to host 202 for validation of the data stored in array 201, responsive to a powering (e.g., a powering on and/or powering up) of memory device 206. As such, a validation of the data stored in memory array 201 can be initiated (e.g., automatically) upon the powering of memory device 206.

As an additional example, circuitry 210 can send the block 220, along with the digital signature associated with block 220, to host 202 upon an external entity, such as host 202, initiating a validation of the data stored in memory array 201. For instance, host 202 can send a command to memory device 206 (e.g., circuitry 210) to sense the block 220, and circuitry 210 can execute the command to sense the block 220, and send the sensed block to host 202 for validation of the data stored in array 201, responsive to receipt of the command.

Upon receiving the block 220, host 202 can validate (e.g., determine whether to validate) the data stored in memory array 201 using the received block. For example, host 202 can use the cryptographic hash of the previous block in the block chain and the cryptographic hash of the data stored in memory array 201 to validate the data. Further, host 202 can validate the digital signature associated with the block 220 to determine the block is included (e.g., is eligible to be included) in the block chain. As used herein, validating the data stored in memory array 201 can include, and/or refer to, authenticating and/or attesting that the data is genuine (e.g., is the same as originally programmed), and has not been altered by hacking activity or other unauthorized changes.

In embodiments in which memory array 201 is a secure array, the golden hash previously described herein may also be used to validate the data stored in memory array 201. For example, a run-time cryptographic hash can be generated (e.g., calculated), and compared with the golden hash. If the comparison indicates the run-time and golden hashes match, it can be determined that the secure array has not been altered, and therefore the data stored therein is valid. If, however, the comparison indicates the run-time and golden hashes do not match, this may indicate that the data stored in the secure array has been changed (e.g., due to a hacker or a fault in the memory), and this can be reported to host 202.

After the validation of the data stored in memory array 201, circuitry 210 can generate an additional (e.g., the next) block in the block chain for validating the data stored in memory array 201, in a manner analogous to which the block 220 was generated. For example, this additional block can include a cryptographic hash of block 220, which has now become the previous block in the block chain, and a new cryptographic hash of the data stored in memory array 201. Further, this additional block can include a header having a timestamp indicating when this block was generated, and can have a digital signature associated therewith that indicates this block is included in the block chain. An example illustrating such an additional block will be further described herein (e.g., in connection with FIG. 3). Further, in embodiments in which memory array 201 is a secure array, an additional (e.g., new) golden hash can be generated.

The additional block, as well as the digital signature associated with the additional block, and the additional golden hash, can be stored in memory array 201. For example, the additional block can replace block 220 (e.g., the previous block) in memory array 201. The additional block, digital signature, and additional golden hash can then be used by host 202 to validate the data stored in memory array 201, in a manner analogous to that previously described herein for block 220. Additional blocks in the block chain can continue to be generated by circuitry 210, and used by host 202 to validate the data stored in memory array 201, in such manner throughout the lifetime of memory device 206.

The embodiment illustrated in FIG. 2 can include additional circuitry, logic, and/or components not illustrated so as not to obscure embodiments of the present disclosure. For example, memory device 206 can include address circuitry to latch address signals provided over I/O connectors through I/O circuitry. Address signals can be received and decoded by a row decoder and a column decoder, to access memory array 201. Further, memory device 206 can include a main memory, such as, for instance, a DRAM or SDRAM, that is separate from and/or in addition to memory array 201. An example further illustrating additional circuitry, logic, and/or components of memory device 206 will be further described herein (e.g., in connection with FIG. 10).

FIG. 3 illustrates examples of blocks (e.g., block 320-1 and block 320-2) that can be used in a block chain for validating data stored in memory (e.g. in memory array 201 previously described in connection with FIG. 2) in accordance with an embodiment of the present disclosure. Blocks 320-1 and 320-2 can be generated, for instance, using circuitry 210 previously described in connection with FIG. 2. For example, block 320-2 can be generated after block 320-1 has been used to validate the data stored in the memory (e.g., block 320-2 can be the next block in the block chain after block 320-1).

As shown in FIG. 3, each respective block 320-1 and 320-2 can include a header, a cryptographic hash of the previous block in the block chain, and a cryptographic hash of the data stored in the memory, in a manner analogous to block 220 previously described in connection with FIG. 2. For example, block 320-1 includes header 322-1 having a timestamp indicating when block 320-1 was generated, cryptographic hash 324-1 of the previous block in the block chain, and cryptographic hash 326-1 of the data stored in the memory. Further, block 320-2 includes header 322-2 having a timestamp indicating when block 320-2 was generated, cryptographic hash 324-2 of the previous block (e.g., block 320-1) in the block chain, and a subsequent (e.g., new) cryptographic hash 326-2 of the data stored in the memory.

As shown in FIG. 3, cryptographic hash 326-1 of block 320-1 can be used as cryptographic hash 324-2 of block 320-2. That is, block 320-2 can include cryptographic hash 326-1 of the data stored in the memory from block 320-1 as cryptographic hash 324-2 of the previous block in the block chain.

As shown in FIG. 3, each respective block 320-1 and 320-2 can have a digital signature associated therewith that indicates the block is included in the block chain, in a manner analogous to block 220 previously described in connection with FIG. 2. For example, digital signature 328-1 is associated with block 320-1, and digital signature 328-2 is associated with block 320-2.

Figure 4B:
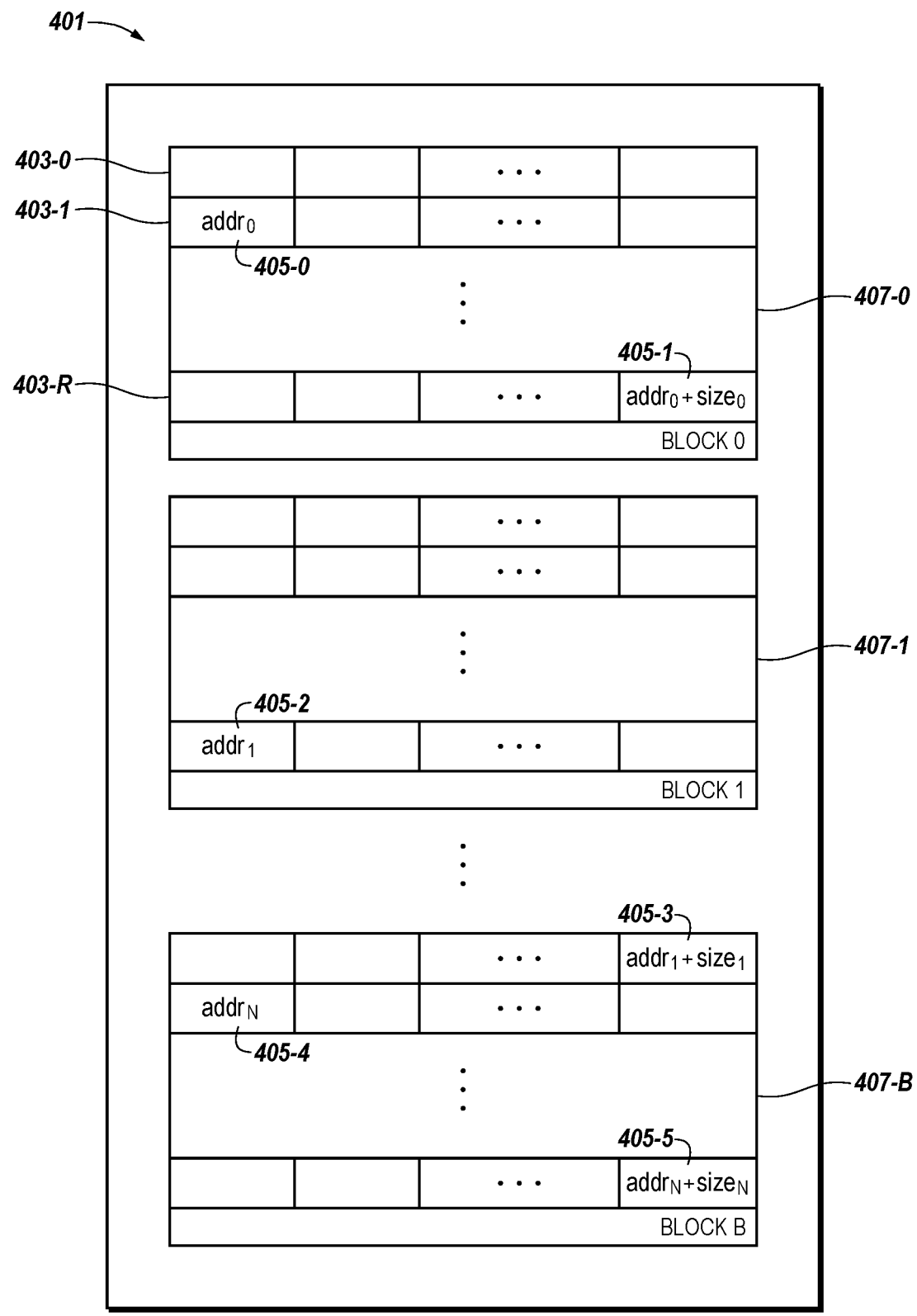
FIG. 4B illustrates a diagram of a portion of a memory array that includes a secure memory array defined in accordance with an embodiment of the present disclosure.

FIG. 4A illustrates an example of a pair of registers 414-1 and 414-2 used to define a secure memory array in accordance with an embodiment of the present disclosure, and FIG. 4B illustrates a diagram of a portion of a memory array 401 that includes a secure memory array defined using registers 414-1 and 414-2 in accordance with an embodiment of the present disclosure. Registers 414-1 and 414-2 can be, for instance, registers 214-1 and 214-2, respectively, previously described in connection with FIG. 2, and secure memory array 401 can be, for instance, memory array 201 previously described in connection with FIG. 2. For instance, as shown in FIG. 4B, secure memory array 401 can include a number of physical blocks 407-0, 407-1, . . . 407-B of memory cells, each including a number of physical rows 403-0, 403-1, . . . 403-R having a number of sectors of memory cells, in a manner analogous to memory array 101 previously described in connection with FIG. 1.

As shown in FIG. 4A, register 414-1 can define addresses of the secure array (e.g., the addresses of different portions of the secure array), and register 414-2 can define sizes of the secure array (e.g., the sizes of the different portions of the secure array). The addresses of the secure array defined by register 414-1 can correspond to, for instance, starting points (e.g., starting LBAs) of the secure array (e.g., the starting points of the different portions of the secure array), and the sizes of the secure array defined by register 414-2 can correspond to, for instance, ending points (e.g., ending LBAs) of the secure array (e.g., the ending points of the different portions of the secure array).

For example, as shown in FIG. 4A, registers 414-1 and 414-2 can define N pairs of values, with each respective pair comprising an address value (e.g., addr) defined by register 414-1 and a size value (e.g., size) defined by register 414-2.

For instance, in the example illustrated in FIG. 4A, $Pair_0$ comprises address value $addr_0$ and size value $size_0$ (e.g., $Pair_0 = [addr_0, size_0]$), $Pair_1$ comprises address value $addr_1$ and size value $size_1$ (e.g., $Pair_1 = [addr_1, size_1]$), and so on, with $Pair_N$ comprising address value $addr_N$ and size value $size_N$ (e.g., $Pair_N = [addr_N, size_N]$). The address value of a pair can correspond to a starting point (e.g., starting LBA) of a portion of the secure array, and the sum of the address value and the size value of that pair can correspond to the ending point (e.g., ending LBA) of that portion of the secure array. As such, the entire secure array (e.g., the portions that comprise the entire secure array) can be given by: $[addr_0, addr_0+size_0] \cup [addr_1, addr_1+size_1] \cup \ldots \cup [addr_N, addr_N+size_N]$.

The first pair whose size value defined by register 414-2 is zero can stop the definition of the secure array. For instance, in the example illustrated in FIG. 4A, if the size value of $Pair_2$ is zero, then the secure array would be given by: $[addr_0, addr_0+size_0] \cup [addr_1, addr_1+size_1]$.

An example of a secure array defined by registers 414-1 and 414-2 (e.g., with all size values defined by register 414-2 as non-zero) is illustrated in FIG. 4B. For instance, as shown in FIG. 4B, the address (e.g., LBA) associated with sector 405-0 of memory array 401 is $addr_0$, the address associated with sector 405-1 of memory array 401 is $addr_0+size_0$, the address associated with sector 405-2 of memory array 401 is $addr_1$, the address associated with sector 405-3 of memory array 401 is $addr_1+size_1$, the address associated with sector 405-4 of memory array 401 is $addr_N$, and the address associated with sector 405-5 of memory array 401 is $addr_N+size_N$. As such, the secure array comprises sectors (e.g., the data stored in sectors) 405-0 through 405-1, sectors 405-2 through 405-3, and 405-4 through 405-5. However, the sectors of memory array 401 that are before sector 405-0, and sectors 405-1 through 405-2 of memory array 401, are not part of the secure array (e.g., the secure array comprises a subset of array 401).

Figure 5:
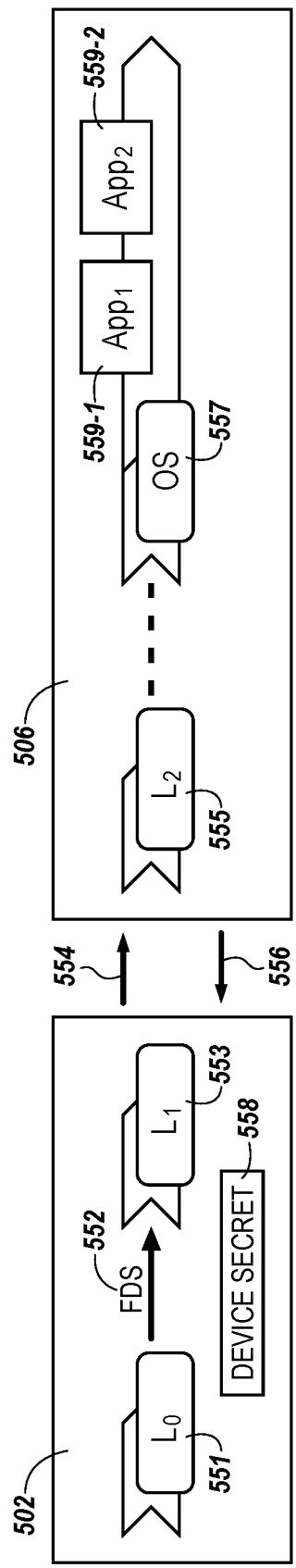
FIG. 5 is a block diagram of an example system including a host and a memory device in accordance with an embodiment of the present disclosure.

FIG. 5 is a block diagram of an example system including a host 502 and a memory device 506 in accordance with an embodiment of the present disclosure. Host 502 and memory device 506 can be, for example, host 202 and memory device 206, respectively, previously described in connection with FIG. 2.

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 5, Layer 0 ("$L_0$") 551 and Layer 1 ("$L_1$") 553 are within the host. Layer 0 551 can provide a Firmware Derivative Secret (FDS) key 552 to Layer 1 553. The FDS key 552 can describe the identity of code of Layer 1 553 and other security relevant data. In an example, a particular protocol (such as robust internet of things (RIOT) core protocol) can use the FDS 552 to validate code of Layer 1 553 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 558 can be used to create the FDS 552 and be stored in memory of the host 502.

The host can transmit data, as illustrated by arrow 554, to the memory device 506. The transmitted data can include an external identification that is public, a certificate (e.g., an external identification certificate), and/or an external public key. Layer 2 ("L₂") 555 of the memory device 506 can receive the transmitted data, and execute the data in operations of the operating system ("OS") 557 and on a first application 559-1 and a second application 559-2.

In an example operation, the host 502 can read the device secret 558, hash an identity of Layer 1 553, and perform a calculation including:

$$K_{L1}=KDF[Fs(s),Hash(\text{"immutable information"})]$$

where $K_{L1}$ is an external public key, KDF (e.g., KDF defined in the National Institute of Standards and Technology (NIST) Special Publication 800-108) is a key derivation function (e.g., HMAC-SHA256), and Fs(s) is the device secret 558. FDS 552 can be determined by performing:

$$FDS=HMAC\text{-}SHA256[Fs(s),SHA256(\text{"immutable information"})]$$

Likewise, the memory device 506 can transmit data, as illustrated by arrow 556, to the host 502.

Figure 6:
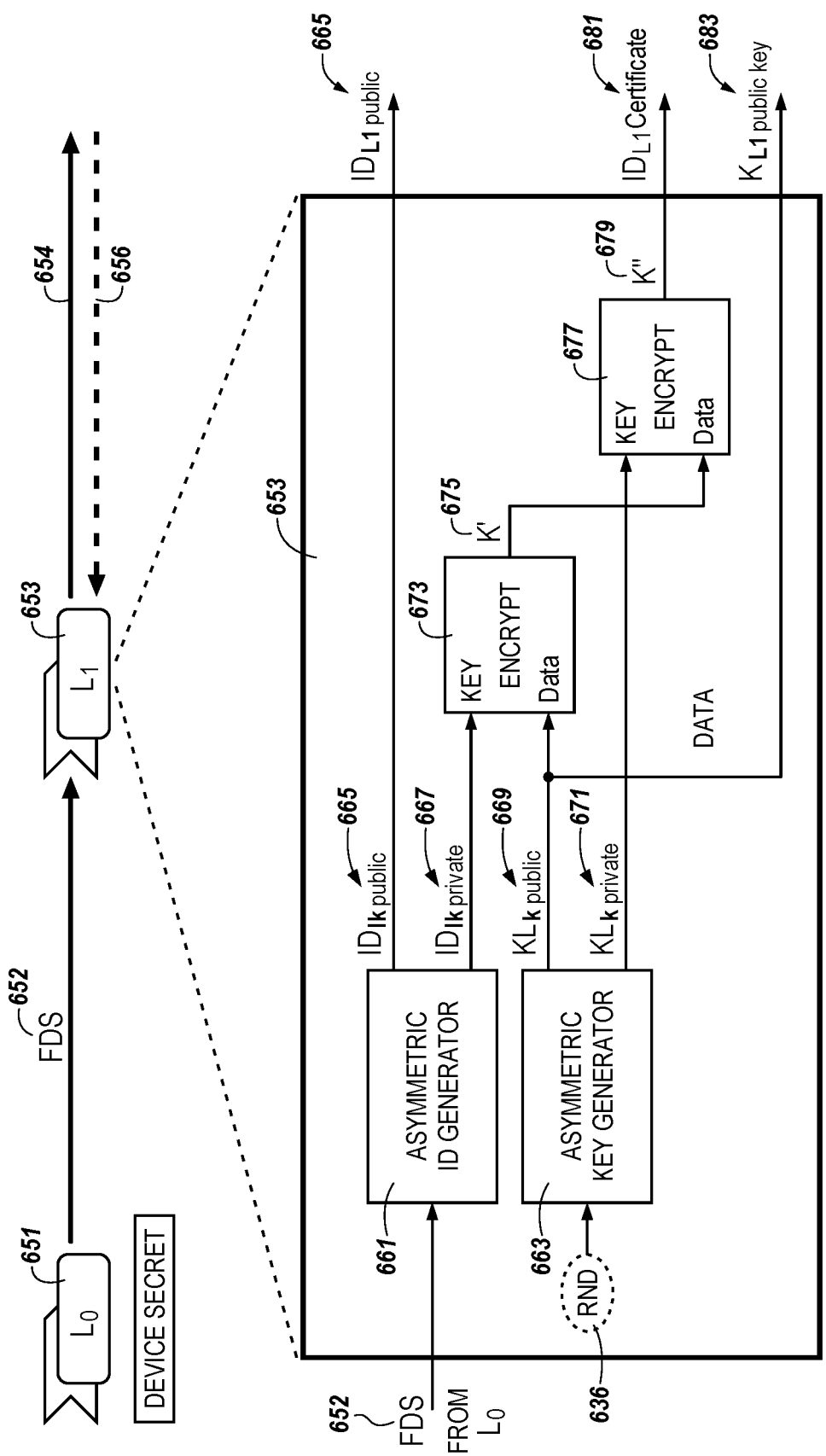
FIG. 6 is a block diagram of an example process to determine a number of parameters in accordance with an embodiment of the present disclosure.

FIG. 6 is a block diagram of an example process to determine a number of parameters in accordance with an embodiment of the present disclosure. FIG. 6 is an example of a determination of the parameters including the external public identification, the external certificate, and the external public key that are then sent, indicated by arrow 654, to Layer 2 (e.g., Layer 2 555) of a memory device (e.g., 506 in FIG. 5). Layer 0 ("L₀") 651 in FIG. 6 corresponds to Layer 0 551 in FIG. 5 and likewise FDS 652 corresponds to FDS 552, Layer 1 653 corresponds to Layer 1 553, and arrows 654 and 656 correspond to arrows 554 and 556, respectively.

The FDS 652 from Layer 0 651 is sent to Layer 1 653 and used by an asymmetric ID generator 661 to generate a public identification ("ID$_{lk\ public}$") 665 and a private identification 667. In the abbreviated "ID$_{lk\ public}$," the "lk" indicates Layer k (in this example Layer 1), and the "public" indicates that the identification is openly shared. The public identification 665 is illustrated as shared by the arrow extending to the right and outside of Layer 1 653 of the host. The generated private identification 667 is used as a key input into an encryptor 673. The encryptor 673 can be any processor, computing device, etc. used to encrypt data.

Layer 1 653 of a host can include an asymmetric key generator 663. In at least one example, a random number generator (RND) 636 can optionally input a random number into the asymmetric key generator 663. The asymmetric key generator 663 can generate a public key ("K$_{Lk\ public}$") 669 (referred to as an external public key) and a private key ("K$_{LK\ private}$") 671 (referred to as an external private key) associated with a host such as host 502 in FIG. 5. The external public key 669 can be an input (as "data") into the encryptor 673. The encryptor 673 can generate a result K'675 using the inputs of the external private identification 667 and the external public key 669. The external private key 671 and the result K'675 can be input into an additional encryptor 677, resulting in output K" 679. The output K" 679 is the external certificate ("ID$_{L1}$ certificate") 681 transmitted to the Layer 2 (555 of FIG. 5). The external certificate 681 can provide an ability to verify and/or authenticate an origin of data sent from a device. As an example, data sent from the host can be associated with an identity of the host by verifying the certificate, as will be described further in association with FIG. 8. Further, the external public key ("K$_{L1\ public\ key}$") 683 can be transmitted to Layer 2. Therefore, the public identification 665, the certificate 681, and the external public key 683 of a host can be transmitted to Layer 2 of a memory device.

Figure 7:
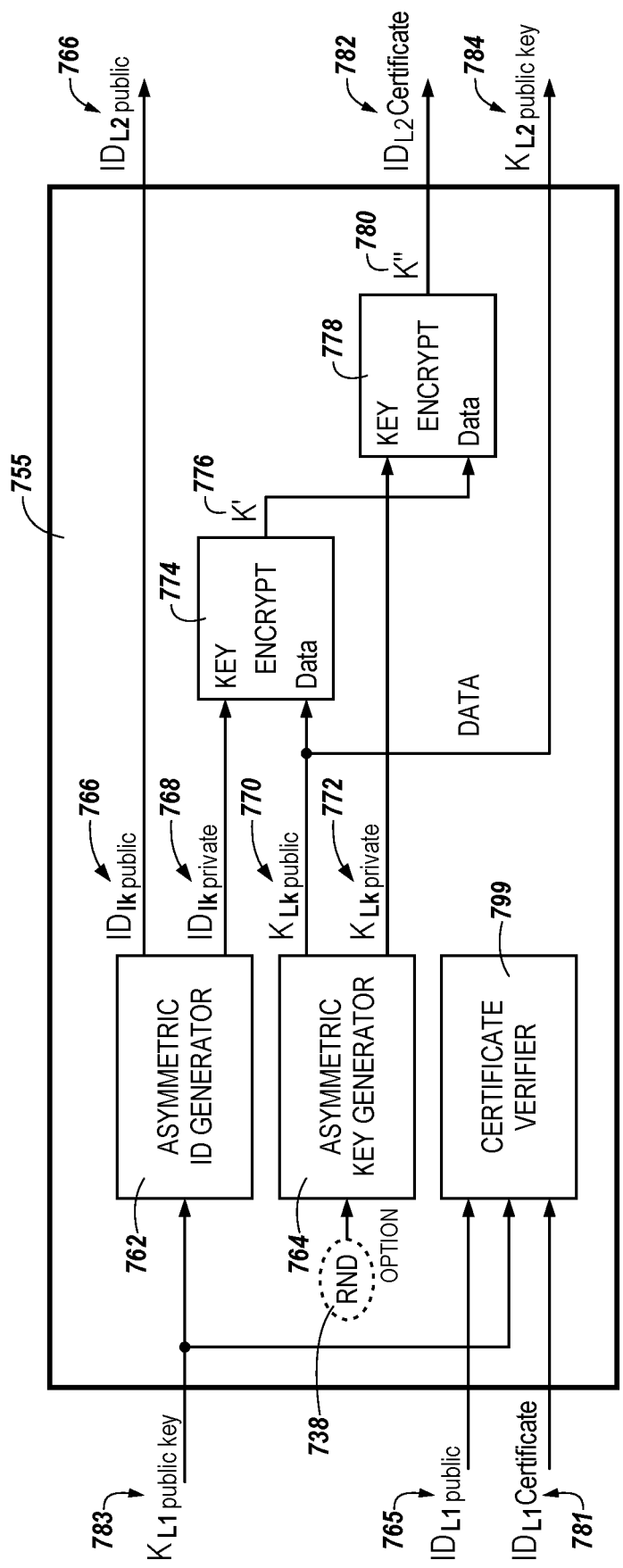
FIG. 7 is a block diagram of an example process to determine a number of parameters in accordance with an embodiment of the present disclosure.

FIG. 7 is a block diagram of an example process to determine a number of parameters in accordance with an embodiment of the present disclosure. FIG. 7 illustrates a Layer 2 755 of a memory device (e.g., memory device 506 in FIG. 5) generating a device identification ("ID$_{L2}$ public") 766, a device certificate ("ID$_{L2}$ Certificate") 782, and a device public key ("K$_{L2}$ public key") 784.

The external public key ("K$_{L1}$ public key") 783 transmitted from Layer 1 of the host to Layer 2 755 of a memory device, as described in FIG. 6, is used by an asymmetric ID generator 762 of the memory device to generate a public identification ("ID$_{lk\ public}$") 766 and a private identification 768 of the memory device. In the abbreviated "ID$_{lk\ public}$," the "lk" indicates Layer k (in this example Layer 2), and the "public" indicates that the identification is openly shared. The public identification 766 is illustrated as shared by the arrow extending to the right and outside Layer 2 755. The generated private identification 768 is used as a key input into an encryptor 774.

As shown in FIG. 7, the external certificate 781 and public identification 765, along with the external public key 783, are used by a certificate verifier 799. The certificate verifier 799 can verify the external certificate 781 received from a host, and determine, in response to the external certificate 781 being verified or not being verified, whether to accept or discard data received from the host. Further details of verifying the external certificate 781 are further described herein (e.g., in connection with FIG. 8).

Layer 2 755 of the memory device can include an asymmetric key generator 764. In at least one example, a random number generator (RND) 738 can optionally input a random number into the asymmetric key generator 764. The asymmetric key generator 764 can generate a public key ("K$_{Lk\ public}$") 770 (referred to as a device public key) and a private key ("K$_{LK\ private}$") 772 (referred to as a device private key) associated with a memory device such as memory device 506 in FIG. 5. The device public key 770 can be an input (as "data") into the encryptor 774. The encryptor 774 can generate a result K' 776 using the inputs of the device private identification 768 and the device public key 770. The device private key 772 and the result K' 776 can be input into an additional encryptor 778, resulting in output K" 780. The output K" 780 is the device certificate ("ID$_{L2}$ certificate") 782 transmitted back to the Layer 1 (553 of FIG. 5). The device certificate 782 can provide an ability to verify and/or authenticate an origin of data sent from a device. As an example, data sent from the memory device can be associated with an identity of the memory device by verifying the certificate, as will be described further in association with FIG. 8. Further, the device public key ("K$_{L2\ public\ key}$") 784 can be transmitted to Layer 1. Therefore, the public identification 766, the certificate 782, and the device public key 784 of the memory device can be transmitted to Layer 1 of a host.

In an example, in response to a host receiving a public key from a memory device, the host can encrypt data to be sent to the memory device using the device public key. Vice versa, the memory device can encrypt data to be sent to the host using the external public key. In response to the memory device receiving data encrypted using the device public key, the memory device can decrypt the data using its own device private key. Likewise, in response to the host receiving data encrypted using the external public key, the host can decrypt the data using its own external private key.

As the device private key is not shared with another device outside the memory device and the external private key is not shared with another device outside the host, the data sent to the memory device and the host remains secure.

Figure 8:
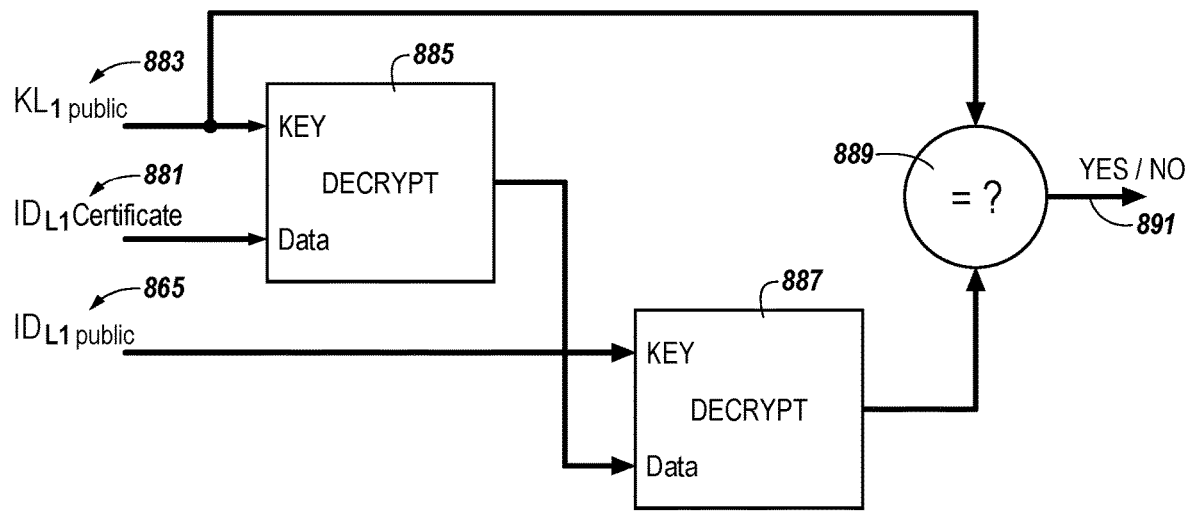
FIG. 8 is a block diagram of an example process to verify a certificate in accordance with an embodiment of the present disclosure.

FIG. 8 is a block diagram of an example process to verify a certificate in accordance with an embodiment of the present disclosure. In the illustrated example of FIG. 8, a public key 883, a certificate 881, and a public identification 865 is provided from a host (e.g., from Layer 1 553 of host 502 in FIG. 5). The data of the certificate 881 and the external public key 883 can be used as inputs into a decryptor 885. The decryptor 885 can be any processor, computing device, etc used to decrypt data. The result of the decryption of the certificate 881 and the external public key 883 can be used as an input into a secondary decryptor 887 along with the public identification, result in an output. The external public key 883 and the output from the decryptor 887 can indicate, as illustrated at 889, whether the certificate is verified, resulting in a yes or no 891 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 9:
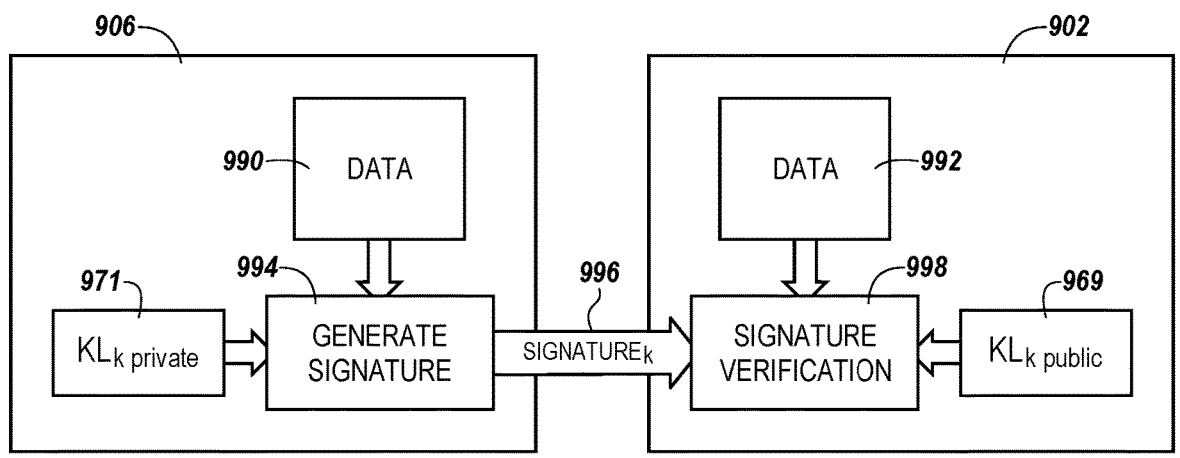
FIG. 9 is a block diagram of an example process to verify a signature in accordance with an embodiment of the present disclosure.

FIG. 9 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A memory device 906 (such as memory device 206 in FIG. 2) can send data 990 to a host (such as host 202 in FIG. 2). The memory device 906 can generate, at 994, a signature 996 using a device private key 971. The signature 996 can be transmitted to the host 902. The host 902 can verify, at 998, the signature using data 992 and the external public key 969 previously received. In this way, the signature is generated using a private key and verified using a public key. In this way, the private key used to generate a unique signature can remain private to the device sending the signature while allowing the receiving device to be able to decrypt the signature using the public key of the sending device for verification. This is in contrast to encryption/decryption of the data, which is encrypted by the sending device using the public key of the receiving device and decrypted by the receiving device using the private key of the receiver. In at least one example, the device can verify the digital signature by using an internal cryptography process (e.g., Elliptical Curve Digital signature (ECDSA) or a similar process.

Figure 10:
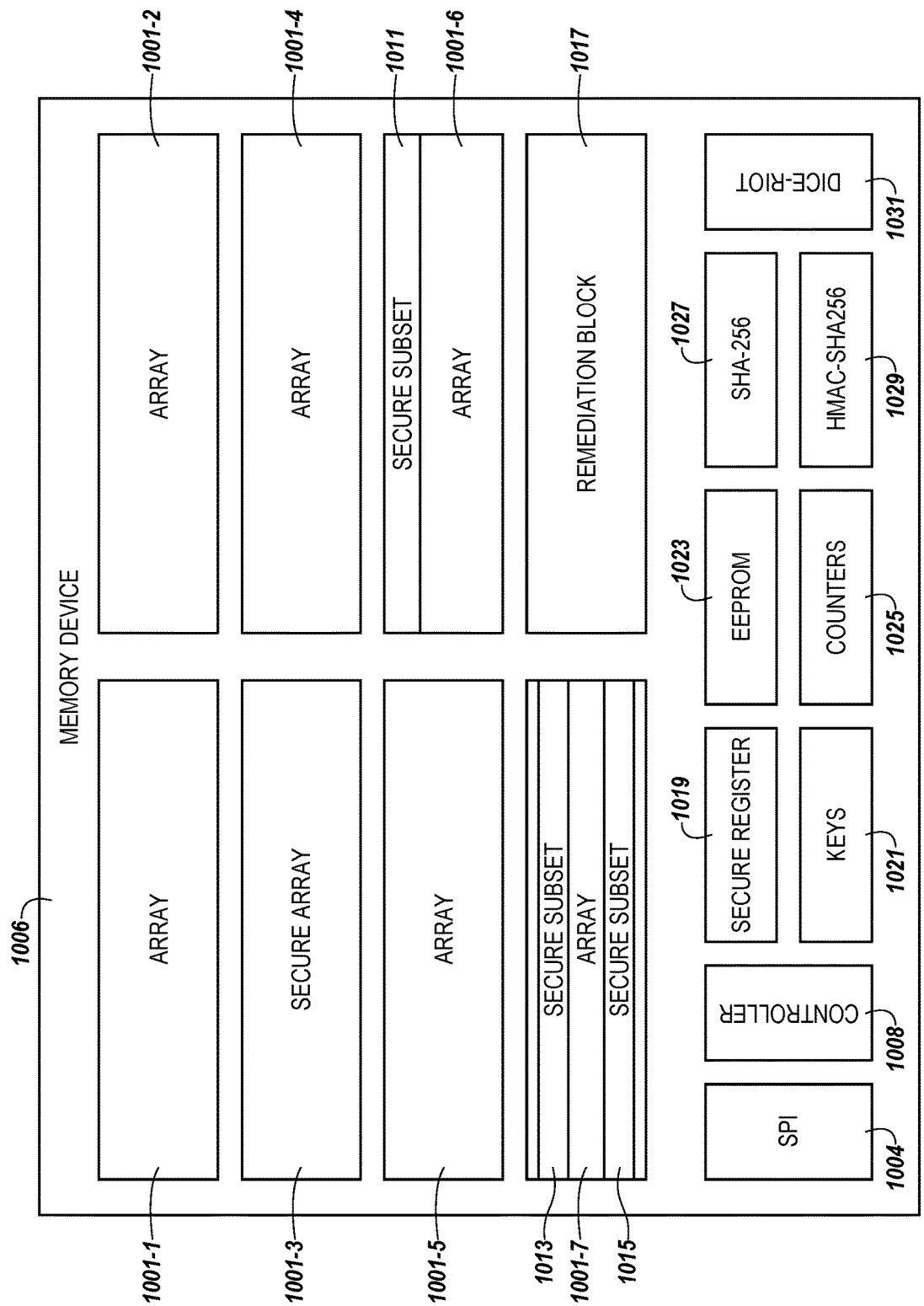
FIG. 10 is a block diagram of an example memory device in accordance with an embodiment of the present disclosure.

FIG. 10 is a block diagram of an example memory device 1006 in accordance with an embodiment of the present disclosure. Memory device 1006 can be, for example, memory device 206 previously described in connection with FIG. 2.

As shown in FIG. 10, memory device 1006 can include a number of memory arrays 1001-1 through 1001-7. Memory arrays 1001-1 through 1001-7 can be analogous to memory array 101 previously described in connection with FIG. 1.

Further, in the example illustrated in FIG. 10, memory array 1001-3 is a secure array, subset 1011 of memory array 1001-6 comprises a secure array, and subsets 1013 and 1015 of memory array 1001-7 comprise a secure array. Subsets 1011, 1013, and 1015 can each include, for instance, 4 kilobytes of data. However, embodiments of the present disclosure are not limited to a particular number or arrangement of memory arrays or secure arrays.

As shown in FIG. 10, memory device 1006 can include a remediation (e.g., recovery) block 1017. Remediation block 1017 can be used as a source of data in case of errors (e.g., mismatches) that may occur during operation of memory device 1006. Remediation block 1017 may be outside of the area of memory device 1006 that is addressable by a host.

As shown in FIG. 10, memory device 1006 can include a serial peripheral interface (SPI) 1004 and a controller 1008. Memory device 1006 can use SPI 1004 and controller 1008 to communicate with a host and memory arrays 1001-1 through 1001-7, as previously described herein (e.g., in connection with FIG. 2).

As shown in FIG. 10, memory device 1006 can include a secure register 1019 for managing the security of memory device 1006. For example, secure register 1019 can configure, and communicate externally, to an application controller. Further, secure register 1019 may be modifiable by an authentication command.

As shown in FIG. 10, memory device 1006 can include keys 1021. For instance, memory device 1006 can include eight different slots to store keys such as root keys, DICE-RIOT keys, and/or other external session keys.

As shown in FIG. 10, memory device 1006 can include an electronically erasable programmable read-only memory (EEPROM) 1023. EEPROM 1023 can provide a secure non-volatile area available for a host, in which individual bytes of data can be erased and programmed.

As shown in FIG. 10, memory device 1006 can include counters (e.g., monotonic counters) 1025. Counters 1025 can be used as an anti-replay mechanism (e.g., freshness generator) for commands (e.g., to sign a command set or sequence) received from and/or sent to a host. For instance, memory device 1006 can include six different monotonic counters, two of which may be used by memory device 1006 for the authenticated commands, and four of which may be used by the host.

As shown in FIG. 10, memory device 1006 can include an SHA-256 cryptographic hash function 1027, and/or an HMAC-SHA256 cryptographic hash function 1029. SHA-256 and/or HMAC-SHA256 cryptographic hash functions 1027 and 1029 can be used by memory device 1006 to generate cryptographic hashes, such as, for instance, the cryptographic hashes of block 220 previously described herein, and/or a golden hash used to validate the data stored in memory arrays 1001-1 through 1001-7 as previously described herein. Further, memory device 1006 can support L0 and L1 of DICE-RIOT 1031.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory, wherein the memory comprises an array of memory cells; and
   circuitry configured to:
      define an address of the array and a size of the array; and
      use the memory as a block in a block chain data structure for validating data stored in the memory.

2. The apparatus of claim 1, wherein the circuitry is configured to use the memory as a block in the block chain data structure by using the memory as a storage component for the block chain data structure.

3. The apparatus of claim 1, wherein the block includes a cryptographic hash of a previous block in the block chain data structure.

4. The apparatus of claim 1, wherein the block includes a cryptographic hash of the data stored in the memory.

5. The apparatus of claim 1, wherein the block has a digital signature associated therewith that indicates the block is included in the block chain data structure.

6. The apparatus of claim 1, wherein the circuitry is configured to use the memory as the block in the block chain data structure by modifying existing circuitry of the memory.

7. The apparatus of claim 6, wherein the existing circuitry of the memory comprises firmware.

8. A method of operating memory, comprising:
   generating a block in a block chain data structure for validating data stored in a memory, wherein the memory includes an array of memory cells;
   defining an address of the array and a size of the array; and
   using the memory as a storage component for the block chain data structure.

9. The method of claim 8, wherein using the memory as the storage component for the block chain data structure comprises storing the block in the memory.

10. The method of claim 8, wherein the method includes sending the block to a host for validation of the data stored in the memory.

11. The method of claim 8, wherein the method includes using the memory as the storage component for the block chain data structure without adding additional components to the memory.

12. The method of claim 8, wherein the method includes using the memory as the storage component for the block chain data structure without adding additional circuitry to the memory.

13. The method of claim 8, wherein the method includes generating an additional block in the block chain data structure for validating the data stored in the memory.

14. A system, comprising:
   a memory configured to be used as a block in a block chain data structure for validating data stored in the memory, wherein the memory includes an array of memory cells; and
   a host having control circuitry configured to:
      define an address of the array and a size of the array; and
      validate the data stored in the memory using the memory.

15. The system of claim 14, wherein the control circuitry of the host is configured to validate the data stored in the memory using the memory by:
   receiving the block in the block chain data structure from the memory; and
   validating the data stored in the memory using the received block.

16. The system of claim 14, wherein the block includes:
   a cryptographic hash of a previous block in the block chain data structure; and
   a cryptographic hash of the data stored in the memory.

17. The system of claim 16, wherein the cryptographic hash of the previous block in the block chain data structure and the cryptographic hash of the data stored in the memory comprise a same amount of data.

18. The system of claim 14, wherein the block in the block chain data structure is inaccessible to a user of the memory and a user of the host.

19. The system of claim 14, wherein the memory is configured to be used as an additional block in the block chain data structure for validating the data stored in the memory.

* * * * *